US010668939B2

(12) United States Patent
Yabuuchi et al.

(10) Patent No.: US 10,668,939 B2
(45) Date of Patent: Jun. 2, 2020

(54) WHEEL STRUCTURE AND PUSHCART HAVING THE SAME (71) Applicant: APRICA CHILDREN'S PRODUCTS G.K., Osaka (JP)

(72) Inventors: Hitoshi Yabuuchi, Osaka (JP); Tseshan Peng, Taipei (TW)

(73) Assignee: NEWELL BRANDS JAPAN G.K., Tokyo (JP)

( * ) Notice: Subject to any disclaimer, the term of this patent is extended or adjusted under 35 U.S.C. 154(b) by 0 days.

(21) Appl. No.: 15/886,368

(22) Filed: Feb. 1, 2018

(65) Prior Publication Data

US 2018/0229751 A1 Aug. 16, 2018

(30) Foreign Application Priority Data

Feb. 10, 2017 (JP) .................. 2017-022735

(51) Int. Cl.
B62B 9/08 (2006.01)
B62B 7/08 (2006.01)
B62B 5/04 (2006.01)

(52) U.S. Cl.
CPC ............... B62B 9/08 (2013.01); B62B 5/04 (2013.01); B62B 5/048 (2013.01); B62B 5/0433 (2013.01); B62B 5/0438 (2013.01); B62B 5/0461 (2013.01); B62B 7/08 (2013.01); B62B 9/082 (2013.01); B62B 9/085 (2013.01); B62B 9/087 (2013.01); B62B 2005/0471 (2013.01)

(58) Field of Classification Search
CPC ....... B62B 5/04; B62B 5/0433; B62B 5/0461; B62B 5/0476; B62B 7/08; B62B 9/08; B62B 9/082; B62B 9/087; B62B 2005/0471; B60T 1/005; B60T 7/045; B60T 11/046; B60T 7/122; F16D 63/006; F16D 51/00; F16D 2051/008; Y10T 70/5889
USPC .................... 188/20, 19, 31, 2 F, 22, 171, 30
See application file for complete search history.

(56) References Cited

U.S. PATENT DOCUMENTS

| 1,190,811 | A | * | 7/1916 | Swoyer | ................. | B62B 5/0461 |
| | | | | | | 188/31 |
| 1,416,427 | A | * | 5/1922 | Volkman | ............... | B62B 5/0438 |
| | | | | | | 188/22 |
| 1,450,409 | A | * | 4/1923 | Cirac | .................... | B24D 15/105 |
| | | | | | | 188/30 |
| 5,390,943 | A | * | 2/1995 | Hedrick | ................ | B60T 11/046 |
| | | | | | | 188/22 |
| 2004/0100056 | A1 | * | 5/2004 | Tuan | ...................... | A63C 17/01 |
| | | | | | | 280/87.042 |

(Continued)

FOREIGN PATENT DOCUMENTS

JP 2005306143 A 11/2005
JP 2015160451 A 9/2015

Primary Examiner — Robert A. Siconolfi
Assistant Examiner — San M Aung
(74) Attorney, Agent, or Firm — Eversheds Sutherland (US) LLP (57) ABSTRACT A wheel structure that makes braking easy and prevents sudden stops, and a pushcart having the wheel structure are provided. The wheel structure includes a rotor that is rotatable about an axle and is stopped from rotating by a brake member, a wheel that is coaxial with the rotor and is rotatable about the rotor, and a relative-rotation resisting member that is disposed between the rotor and wheel and produces resistance force resisting the relative rotation of the rotor and wheel.

20 Claims, 12 Drawing Sheets

(56) References Cited

U.S. PATENT DOCUMENTS

| | | | | |
|---|---|---|---|---|
| 2007/0045055 A1* | 3/2007 | Lan | ............................ | B62B 9/08 |
| | | | | 188/20 |
| 2007/0090617 A1* | 4/2007 | Lin | ............................ | B62B 1/18 |
| | | | | 280/47.31 |
| 2007/0262543 A1* | 11/2007 | Fiore | ......................... | B62B 9/24 |
| | | | | 280/47.38 |
| 2008/0185236 A1* | 8/2008 | Chen | ......................... | B62B 7/083 |
| | | | | 188/20 |
| 2014/0345980 A1* | 11/2014 | Shellenberger | ......... | B62B 9/087 |
| | | | | 188/20 |

* cited by examiner

WHEEL STRUCTURE AND PUSHCART HAVING THE SAME

CROSS-REFERENCE TO RELATED APPLICATIONS

This application claims priority to Japanese Patent Application No. 2017-022735 filed Feb. 10, 2017, the entire contents of which are hereby incorporated herein by references for all purposes.

BACKGROUND OF THE DEVICE

Field of the Device

This invention relates to a wheel structure and a pushcart having the wheel structure.

Description of the Related Art

Examples of pushcarts are disclosed in Japanese Unexamined Patent Application Publication Nos. 2005-306143 ("PTL 1") and 2015-160451 ("PTL 2").

PTL 1 discloses that a brake lever is rotationally moved in a braking direction to pull up a brake member mounted on a wheel, and then the pulled-up brake member presses a brake pad against the inner peripheral surface of the wheel to generate contact resistance that applies a brake.

PTL 2 discloses a pushcart that is automatically permitted to move when an operator touches a grip of the pushcart with his/her hand, and is automatically braked to stop the rotation of the wheels when the operator takes his/her hand off the grip.

SUMMARY OF THE DEVICE

The pushcart of PTL 1 uses contact resistance between the brake pad and the inner peripheral surface of the wheel to apply a brake, and therefore the operator needs to press the brake lever with a strong force to make the brake fully effective.

In the case of the pushcart of PTL 2, if the operator mistakenly takes his/her hand off the grip, the rotation of the wheels is automatically braked, which may cause the pushcart to suddenly stop and topple over.

The present invention has been made to solve the aforementioned problems and has an object to provide a wheel structure that makes braking easy and prevents sudden stops, and a pushcart having the wheel structure.

The wheel structure according to an aspect of the present invention includes a rotor that is rotatable about an axle and is stopped from rotating by a brake member, a wheel that is coaxial with the rotor and is rotatable about the rotor, and a relative-rotation resisting member that is disposed between the rotor and wheel and produces resistance force resisting the relative rotation of the rotor and wheel.

Preferably, the magnitude of the resistance force applied by the relative-rotation resisting member is set so as to rotate the wheel and the rotor in an integrated manner when the relative rotational force generated between wheel and rotor is a predetermined value or lower, and is set so as to permit the wheel and rotor to rotate relative to each other when the relative rotational force generated between the wheel and rotor exceeds the predetermined value.

Preferably, the relative-rotation resisting member is a friction member that is held by one of the rotor and the wheel, and abuts against and frictionally engages with the other.

Preferably, the wheel includes an axle supporting section that supports an axle, a tire holding section that faces the axle supporting section and holds a tire making contact with road surfaces, and a ring-shaped recessed section that is provided between the axle supporting section and the tire holding section. The rotor is disposed inside the ring-shaped recessed section.

Preferably, the relative-rotation resisting member is a friction member that is held by the rotor, is biased radially inward from the rotor, and abuts against the axle supporting section.

Preferably, the friction member is provided such that the length in which the friction member projects from rotor toward the axle supporting section is adjustable.

Preferably, the relative-rotation resisting member is a friction member that is held by the rotor, is biased radially outward from the rotor, and abuts against the tire holding section.

Preferably, the friction member is provided such that the length in which the friction member projects from rotor toward the tire holding section is adjustable.

Preferably, the rotor has a receiving hole that receives and is engaged with the brake member.

A pushcart according to an aspect of the present invention includes a main body frame that holds an axle, a rotor that is rotatable about the axle, a wheel that is coaxial with the rotor and is rotatable about the rotor, a brake member that is displaced between an engagement position where the brake member is engaged with the rotor to stop the rotor from rotating, and a non-engagement position where the brake member permits the rotor to rotate without being engaged with the rotor, and a relative-rotation resisting member that is disposed between the wheel and the rotor and produces resistance force resisting the relative rotation of the rotor and wheel.

The present invention configured as above can provide a wheel structure that makes braking easy and prevents sudden stops, and a pushcart having the wheel structure.

The operation and effect of preferred embodiments will be described under the following categories by referring to the drawings.

BRIEF DESCRIPTION OF THE DRAWINGS

FIGS. 2A and 2B depict a part of the stroller according to the first embodiment, and FIG. 2A shows it in a ready-to-move state, while FIG. 2B shows it in a braked state;

FIGS. 6A and 6B depict a brake member, and FIG. 6A shows it in a ready-to-move state, while FIG. 6B shows it in a braked state;

DESCRIPTION OF THE PREFERRED EMBODIMENTS

With reference to the drawings, embodiments of the present invention will be described in detail. The same or similar components are denoted by the same reference symbols or reference numerals throughout the drawings, and the description thereof will not be reiterated.

Figure 1:
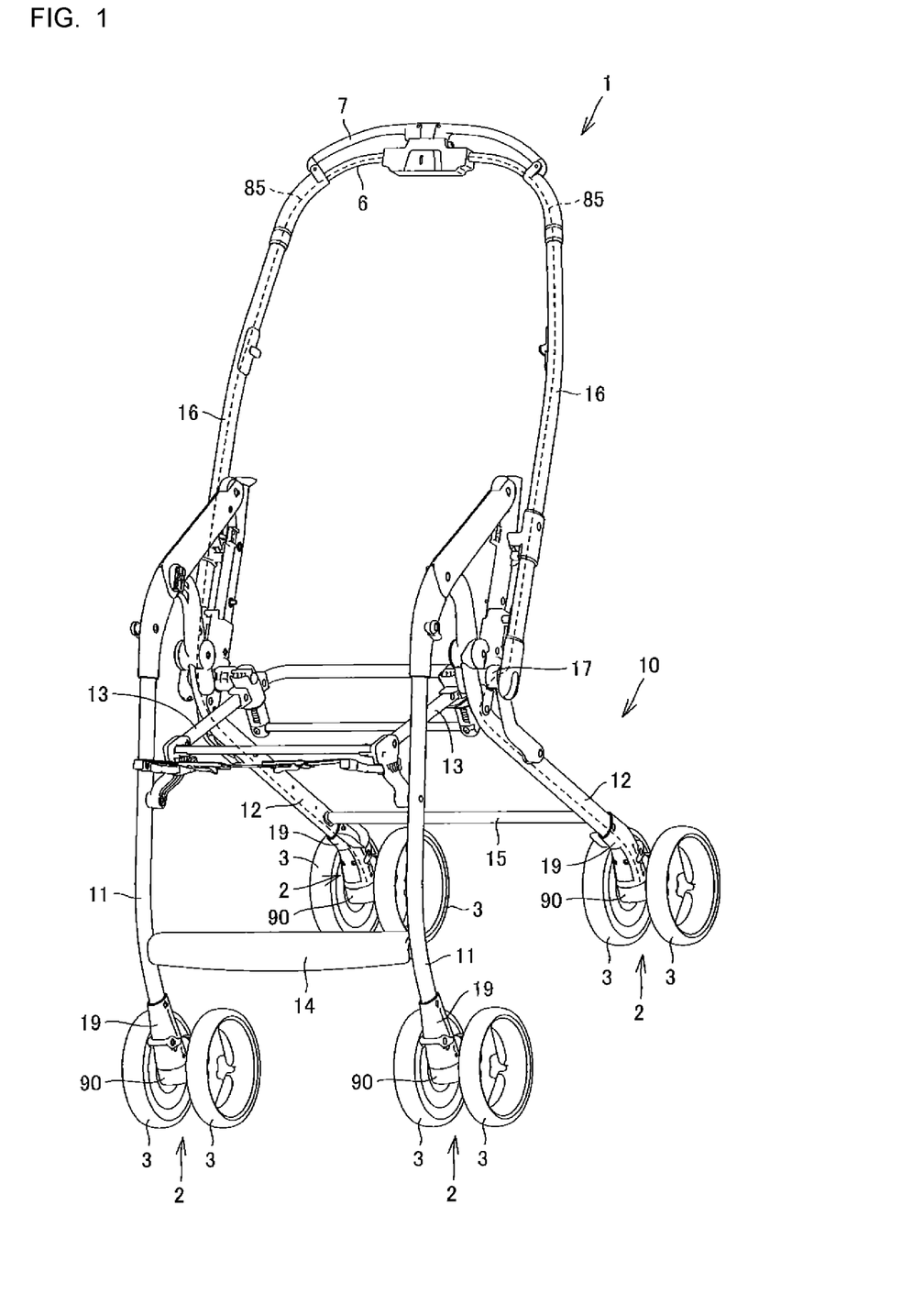
FIG. 1 is a perspective view showing a stroller according to the first embodiment.

About Structure of Stroller—First of all, with reference to FIGS. 1, 2A, 2B, a stroller 1 will be described as a pushcart according to the embodiments. The stroller 1 is, for example, a so-called reversible stroller that has a seat switchable between a rear-facing mode and a forward-facing mode. The stroller 1 shown in FIG. 1 is in a forward-facing mode.

The stroller 1 includes four dual-wheels 2 used as front wheels and rear wheels, a main body frame 10, and a pair of push rods 16. The main body frame 10 includes a pair of front legs 11, a pair of rear legs 12, a pair of seat supporting members 13, a cross member 14 coupling the front legs 11, and a cross member 15 coupling the rear legs 12.

The front legs 11 are a pair of leg portions disposed apart from each other in the width direction. The rear legs 12 are also a pair of leg portions disposed apart from each other in the width direction. The front legs 11 and rear legs 12 hold axles 39 (FIG. 3) at their lower ends. By the way, the "width direction" is synonymous with a transverse direction that is perpendicular to the moving direction of the stroller 1.

Figure 10:
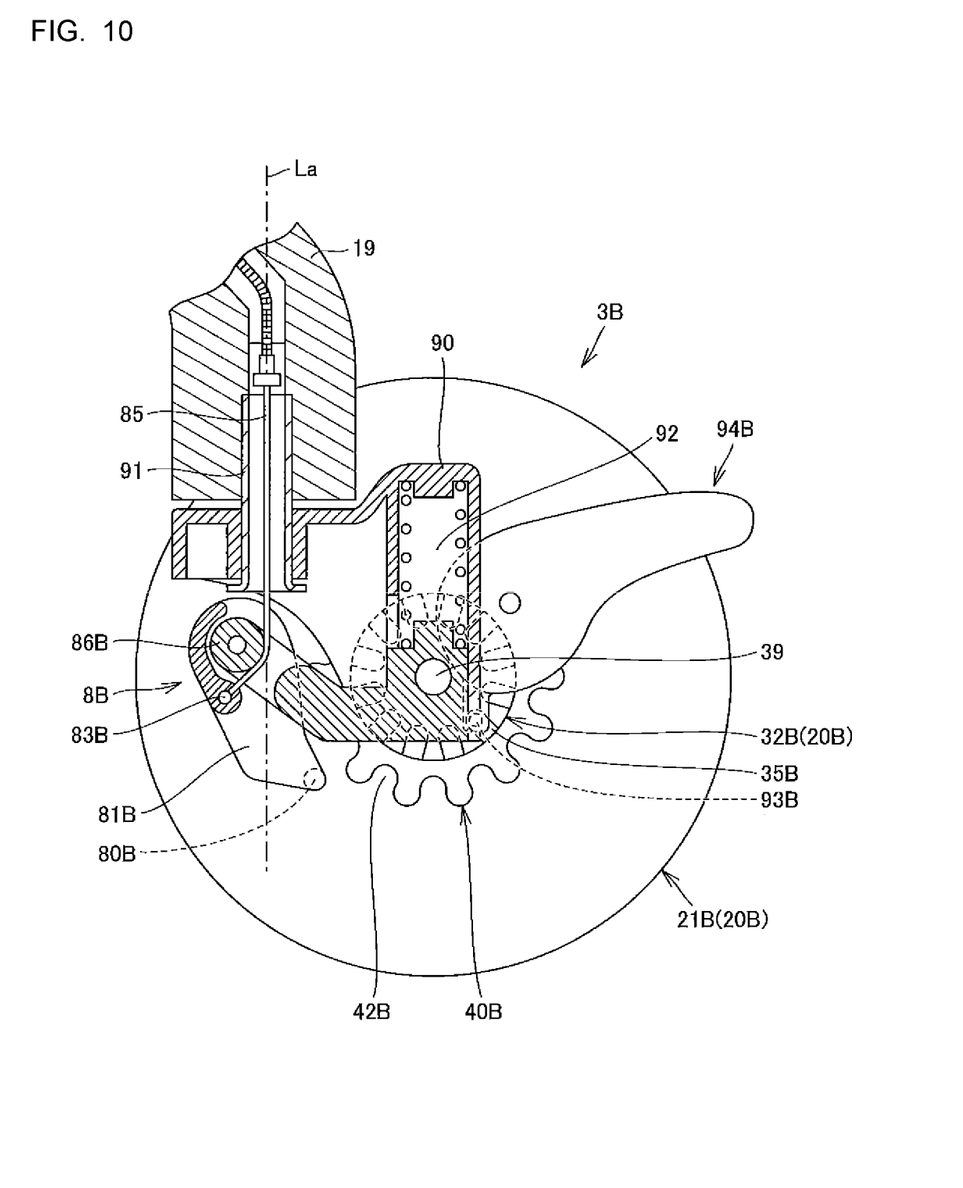
FIG. 10 is a schematic cross-sectional view of a wheel structure according to the third embodiment.

The dual-wheels 2 are aligned in the width direction at forward and rearward positions along the moving direction of the stroller 1 in a forward-facing mode. The dual-wheels 2 are, for example, casters, and are attached to holders 90 with securing elements 19 that are mounted at lower ends of the rear legs 12 and front legs 11 of the stroller 1. As shown in FIG. 10, a holder 90 is coupled to a securing element 19 with a caster shaft 91, which extends along the rotational axis La, so as to rotate relative to the securing element 19. Each of the holders 90 rotatably supports a pair of wheel structures 3 with the axle 39. The holders 90 may have a hollow part in which a suspension 92 is provided to absorb road irregularities to prevent the seat from vibrations. On the holders 90, for example, a brake member 8 (FIGS. 6A and 6B) is mounted to stop the rotation of the wheel structures 3. The details of the wheel structure 3 and brake member 8 will be described later.

The pair of push rods 16 extend roughly vertically and are attached to the main body frame 10 with pivots 17. The upper ends of the push rods 16 are coupled with a handle portion 6. The push rods 16 can pivotally move forward and rearward about the pivot 17.

A brake lever 7 is attached over the handle portion 6, and is used to operate the brake members 8 (FIGS. 6A and 6B) provided adjacent to the wheel structures 3. The brake lever 7 and brake members 8 are coupled to each other with wires 85 running through the main body frame 10. Manipulating the brake lever 7 can displace the brake member 8 provided adjacent to the wheel structures 3. This means that if an operator presses the brake lever 7, the stroller 1 enters a ready-to-move state, while, if the operator takes his/her hand off the brake lever 7, the stroller 1 enters a braked state.

The brake lever 7 extends in the width direction along the handle portion 6, and is attached to the handle portion 6 at the opposite ends. This configuration allows the operator to press the brake lever 7 without fail even if the operator grasps the brake lever 7 with one hand anywhere other than the center part.

Figure 2A:
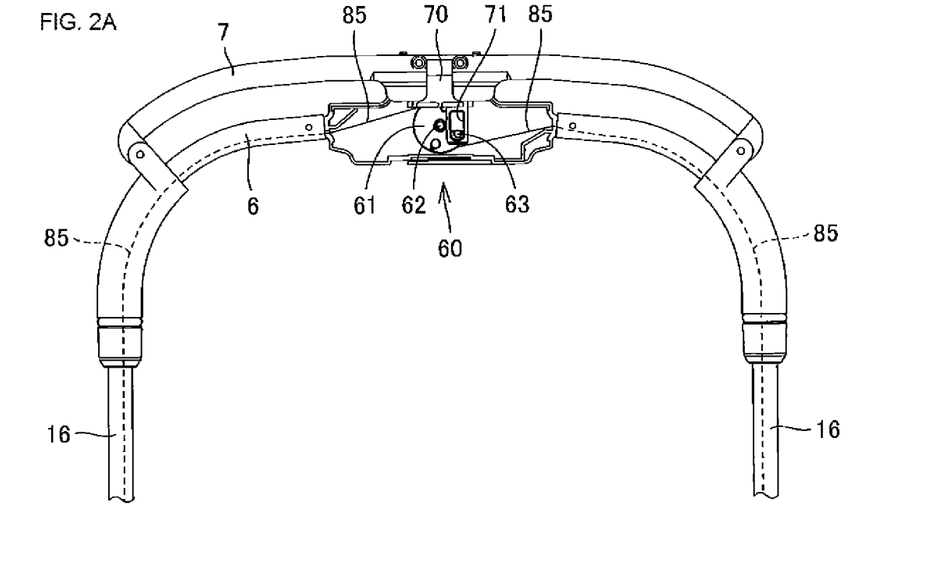
Figure 2B:
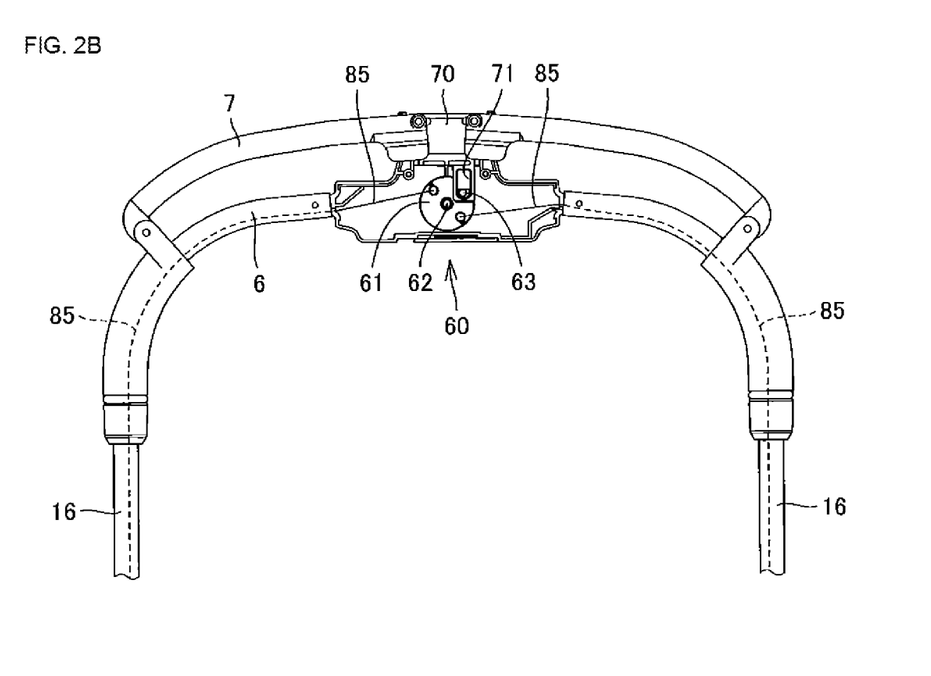

Referring to FIGS. 2A and 2B, the handle portion 6 of this embodiment has an operation area 60 at the center to couple the handle portion 6 with the brake lever 7. In order to provide a clear understanding, FIGS. 2A and 2B show the operation area 60 with a front cover removed.

In the operation area 60 disposed is a rotating member 61 that rotates about a center portion 62. The rotating member 61 is connected to upper ends of the wires 85. The wires 85 are made by cutting a single wire at a midpoint, and the rotating member 61 is connected to the wires 85 at the midpoint. Specifically, the rotating member 61 is a disk-like member, and each of the upper ends of the wires 85 is connected to a decentered position, in other words, a position off the center portion 62, on the rotating member 61. Turning the rotating member 61 can move the wires 85 toward or away from each other.

The rotating member 61 is configured to rotate about the center portion 62 with a press of the brake lever 7 from the top down. When the operator keeps operating (pressing) the brake lever 7, or in other words, when the brake lever 7 is located close to the handle portion 6, as shown in FIG. 2A, the wires 85 are located close to each other. When the operator does not keep operating (pressing) the brake lever 7, or in other words, when the brake lever 7 is located away from the handle portion 6, as shown in FIG. 2B, the wires 85 are located away from each other.

As shown in FIGS. 2A and 2B, an enclosing part 71, which is engaged with a cylindrical projection 63 of the rotating member 61, is provided in the operation area 60. The projection 63 of the rotating member 61 is inserted inside the enclosing part 71 of an operation member 70 to engage the operation member 70 with the rotating member 61. The enclosing part 71 is connected to the operation member 70 that is provided at a top center of the brake lever 7. The rotating member 61 rotates in a clockwise direction with a downward movement of the operation member 70 made by pressing the brake lever 7, while the rotating member 61 rotates in a counterclockwise direction with an upward movement of the operation member 70 made by releasing the brake lever 7, thereby bringing the pair of wires 85 connected to the rotating member 61 toward or away from each other.

As described above, the stroller 1 of this embodiment enters a ready-to-move state when the brake lever 7 is pressed, while entering a stopped state when the brake lever 7 is released. The strollers having such configurations generally enter the stopped state immediately after the operator takes his/her hand off the handle. However, the stroller 1 according to the embodiment does not enter the stopped state immediately, but gradually enters the stopped state after the operator takes his/her hand off the handle. The following will describe in detail the wheel structure 3 of the stroller 1 enabling the gradual transition to the stopped state.

Figure 3:
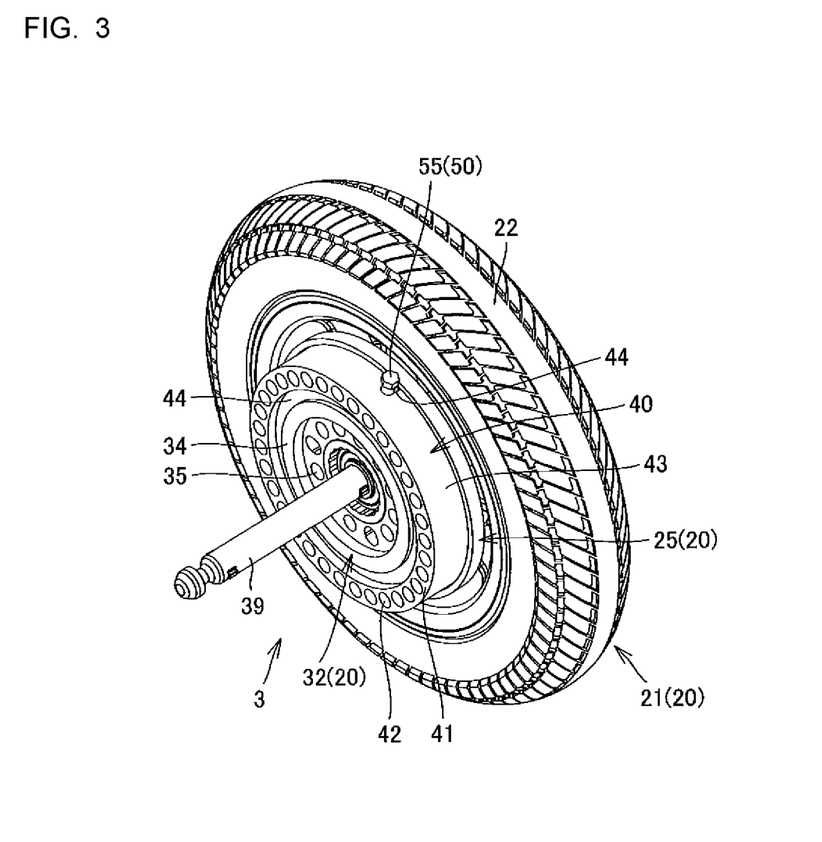
FIG. 3 is a perspective view showing a wheel structure of the stroller according to the first embodiment.

About First Embodiment—Referring to FIGS. 3 to 5, the wheel structure 3 of the stroller 1 will be described. FIG. 5 shows an assembly of a cylindrical member 28 and a cover 32 of a wheel 20, which will be described below, a rotor 40, and a friction member 50.

The wheel structure 3 according to the present embodiment includes a rotor 40 that is rotatable about an axle 39 and is stopped from rotating by a brake member (FIGS. 6A and 6B), a wheel 20 that is rotatable is coaxial with the rotor 40 and is rotatable about the rotor 40, and a relative-rotation resisting member 50 that is disposed between the rotor 40 and wheel 20 and produces resistance force resisting the relative rotation of the rotor 40 and wheel 20.

Figure 4:
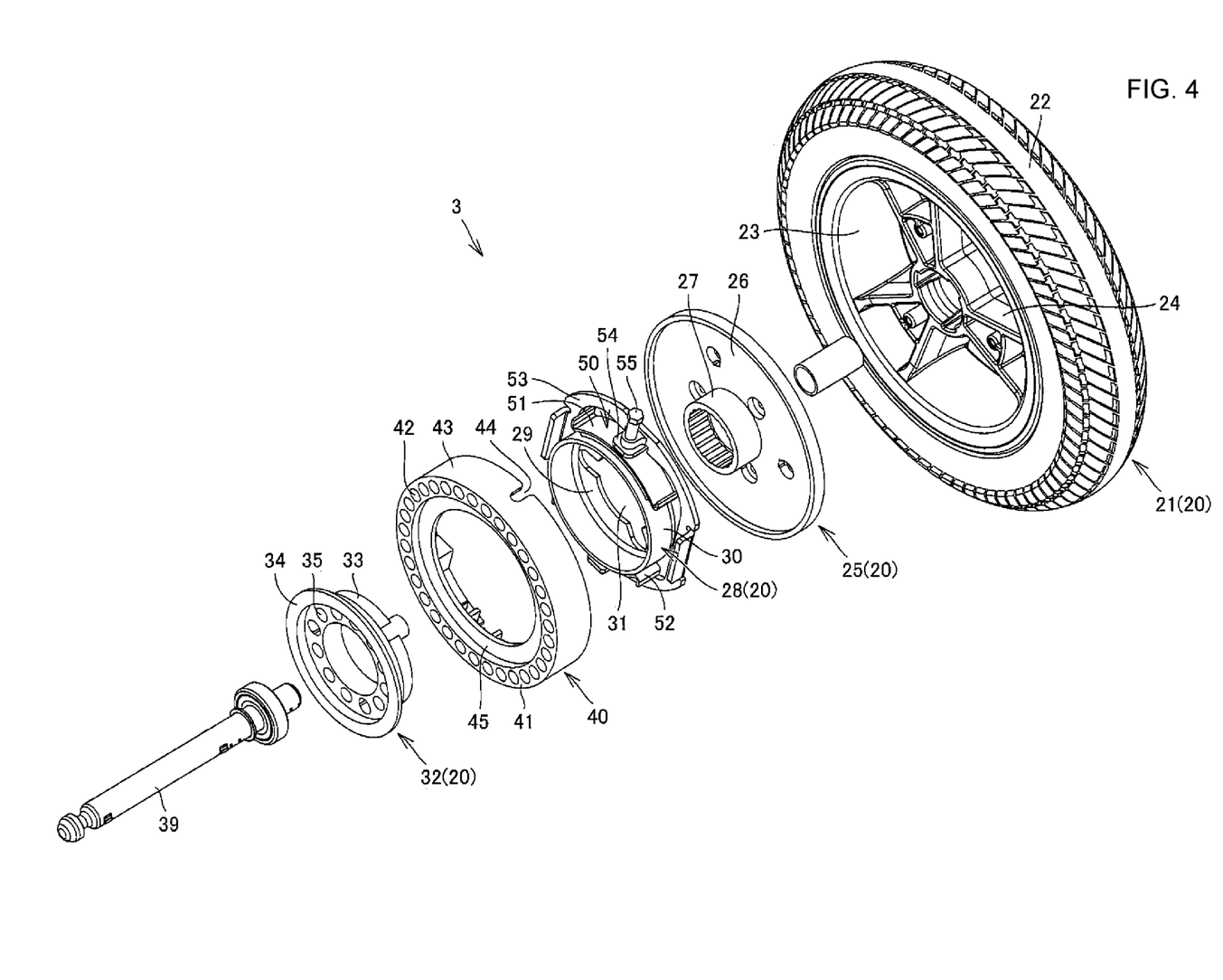
FIG. 4 is an exploded perspective view of the wheel structure according to the first embodiment.
Figure 5:
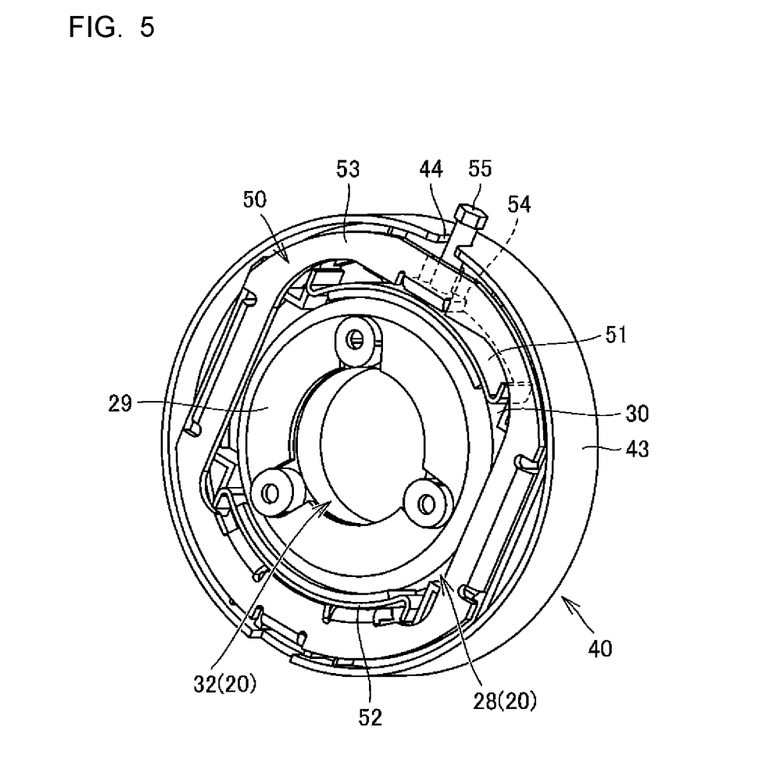
FIG. 5 is a perspective view of a part of the wheel structure according to the first embodiment.

Referring particularly to FIG. 4, the wheel 20 includes, for example, a main wheel body 21, a connector 25, a cylindrical member 28, and a cover 32. The connector 25, cylindrical member 28, and cover 32 are secured to the main wheel body 21. Once the stroller 1 starts moving, the connector 25, cylindrical member 28, and cover 32 rotate with rotation of the main wheel body 21.

In this embodiment, the main wheel body 21 includes a tire 22 that makes contact with road surfaces, a rim 23 that supports the inside edge of the tire 22, and spokes 24 that extend within the rim 23. The spokes 24 are secured so as to face outside of the stroller 1.

The connector 25 is roughly in the shape of a disk, and includes a disk portion 26 having a center hole through which the axle 39 passes, and an axle retainer 27 that encloses the hole. The disk portion 26 is secured to an end of the rim 23 so as not to rotate.

The cylindrical member 28 includes a bottom wall 29, and a raised wall 30 that is raised from the outer circumferential edge of the bottom wall 29. The bottom wall 29 has an opening at the center through which the axle 39 passes. The raised wall 30 is a member against which the relative-rotation resisting member 50 directly abuts.

The cover 32 is a cylindrical member having a center hole through which the axle 39 passes, and includes an upper flange 34, engagement holes 35 formed radially inside the upper flange 34, and an extending portion 33 extending from the upper flange 34 toward the main wheel body 21. The upper flange 34 has an outside diameter greater than the inside diameter of the rotor 40, which will be described later. This diameter difference prohibits the cover 32 from moving toward the rotor 40 in the axial direction. The extending portion 33 has an outside diameter slightly smaller than the inside diameter of the cylindrical member 28, and is non-rotatably secured to the raised wall 30 of the cylindrical member 28. The extending portion 33 has an inside diameter slightly larger than the outside diameter of the axle retainer 27, and is non-rotatably secured to the axle retainer 27 of the connector 25.

The engagement holes 35 are formed to engage with a parking brake member (not shown) that is used to park the stroller 1. Since the cover 32 is firmly attached to the main wheel body 21, engagement of the brake member with the engagement holes 35 of the cover 32 can instantly stop the rotation of the wheel 20. Although it is not illustrated in this embodiment, it is preferable to provide an operation unit for the parking brake member in the vicinity of the wheel structure 3 to provide a foot-operated parking brake member.

As described above, in this embodiment, the axle retainer 27 of the connector 25, the raised wall 30 of the cylindrical member 28, and the extending portion 33 of the cover 32 make up an axle supporting section for supporting the axle 39. In addition, the rim 23 of the main wheel body 21 makes up a tire holding section that faces the axle supporting section and holds the tire 22 making contact with road surfaces. In this embodiment, a ring-shaped recessed section is provided between the axle supporting section (axle retainer 27, raised wall 30, and extending portion 33) and the tire holding section (rim 23).

The rotor 40 can rotate together with the wheel 20, but the rotation is stopped independently of the rotation of the wheel 20 when the brake member (FIGS. 6A and 6B) is operated to stop the rotation of the rotor 40. The rotor 40 is disposed in the ring-shaped recessed section, or more specifically, between the rim 23 of the main wheel body 21 and the raised wall 30 of the cylindrical member 28. In this embodiment, the rotor 40 is roughly in the shape of a cylinder having a center opening through which the axle 39 passes, and includes a front surface 41, and a side surface 43 extending from the outer edge of the front surface 41. The inner edge of the front surface 41 is connected to a lower flange 45. The front surface 41 has a plurality of receiving holes 42. The receiving holes 42 receive the brake member (FIGS. 6A and 6B) and are engaged with it. The side surface 43 has a notch 44.

Referring particularly to FIGS. 4 and 5, the relative-rotation resisting member 50 in this embodiment is a friction member that abuts against the wheel 20 and is frictionally engaged with the wheel 20. The friction member 50 held by the rotor 40 is biased radially inward from the rotor 40, and abuts against the axle supporting section, namely the raised wall 30 of the cylindrical member 28. More specifically, the friction member 50 includes, for example, a moving part 53 having a center opening, and a pair of clamping parts 51, 52 disposed within the moving part 53. The moving part 53 is arranged so as to surround the raised wall 30 of the cylindrical member 28. The clamping parts 51, 52 are opposed to each other, and make contact with the raised wall 30 of the cylindrical member 28 so as to sandwich the raised wall 30 of the cylindrical member 28.

Above the clamping part 51 provided is a rotational screw 55 attached to the moving part 53. The rotational screw 55 extends out of the notch 44 formed in the side surface 43 of the rotor 40. Rotating the rotational screw 55 moves up the moving part 53 that moves up the clamping part 52, and also the rotational screw 55 presses a pressurizing part 54 to move down the clamping part 51. Accordingly, the friction member 50 can be provided such that the length in which the friction member 50 projects from the rotor 40 toward the raised wall 30 of the cylindrical member 28 can be adjustable, and as a result, the frictional force on the raised wall 30 can be adjusted. Since the rotational screw 55 sticks out upwardly from the notch 44 of the rotor 40, the frictional force applied by the friction member 50 can be adjusted while the wheel structure 3 is left mounted on the holder 90.

The magnitude of the resistance force applied by the friction member 50 is set so as to rotate the wheel 20 and rotor 40 in an integrated manner when the relative rotational force generated between the wheel 20 and rotor 40 is a predetermined value or lower, and is set so as to permit the wheel 20 and rotor 40 to rotate relative to each other when the relative rotational force generated between the wheel 20 and rotor 40 exceeds the predetermined value. The relative rotational force generated between the wheel 20 and rotor 40 exceeds the predetermined value when, for example, an engagement part 80 of the brake member 8 (FIGS. 6A and 6B) is engaged with a receiving hole 42 of the rotor 40 while the wheel 20 is rotating. When this occurs, the rotor 40 enters a stopped state, and the wheel 20 in contrast still rotates, but gradually stops rotating due to the frictional resistance force applied on the relative rotation of the rotor 40 and wheel 20 by the friction member 50 held by the rotor 40.

Next, referring to FIGS. 6A and 6B, a brief description will be made about the brake member 8 inserted into a receiving hole 42 of the rotor 40 to engage with the rotor 40.

The brake member 8 is provided, for example, in the holder 90. The brake member 8 includes the engagement part 80 inserted into a receiving hole 42 of the rotor 40 to engage with the rotor 40, and a holding part 81 holding an end of the engagement part 80. The engagement part 80 is, for example, a pin that is designed to be freely inserted into and extracted from a through hole of the holder 90. The holding part 81 holds the engagement part 80 at one end, and holds a spring member 84 in a hollow housing portion 82 provided at the other end. The spring member 84 is biased so as to push the engagement part 80 out of the through hole of the holder 90. In addition, the holding part 81 rotatably holds a spherical object 83 connected to one end of a wire 85.

Figure 6A:
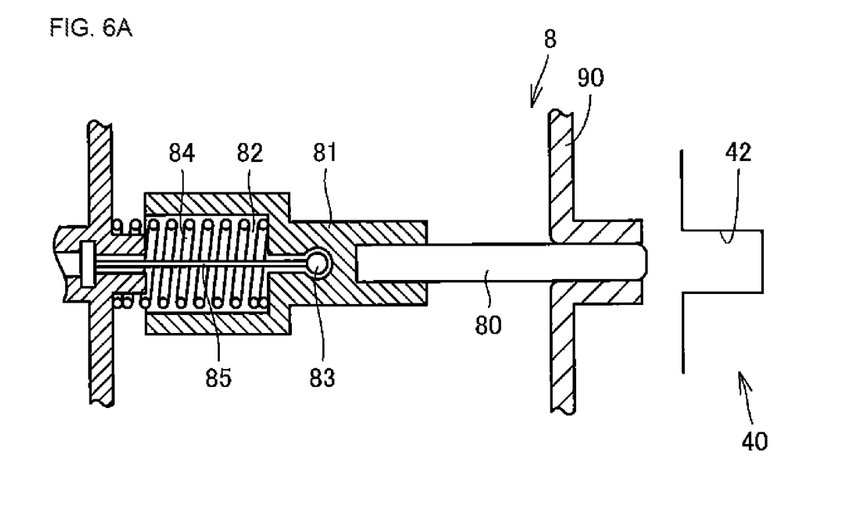

If the operator presses the brake lever 7 to pull up the wire 85, the engagement part 80 is pulled off from the receiving hole 42 to be displaced to a non-engagement position as shown in FIG. 6A, thereby permitting the rotation of the rotor 40. If the operator takes his/her hand off the brake lever 7 to pull down the wire 85, the engagement part 80 is engaged with the receiving hole 42 to be displaced to an engagement position as shown in FIG. 6B, thereby stopping the rotation of the rotor 40.

Referring particularly to FIGS. 2A, 2B, 6A, 6B, 7A, 7B, a ready-to-move state and braked state will be described.

Figure 7A:
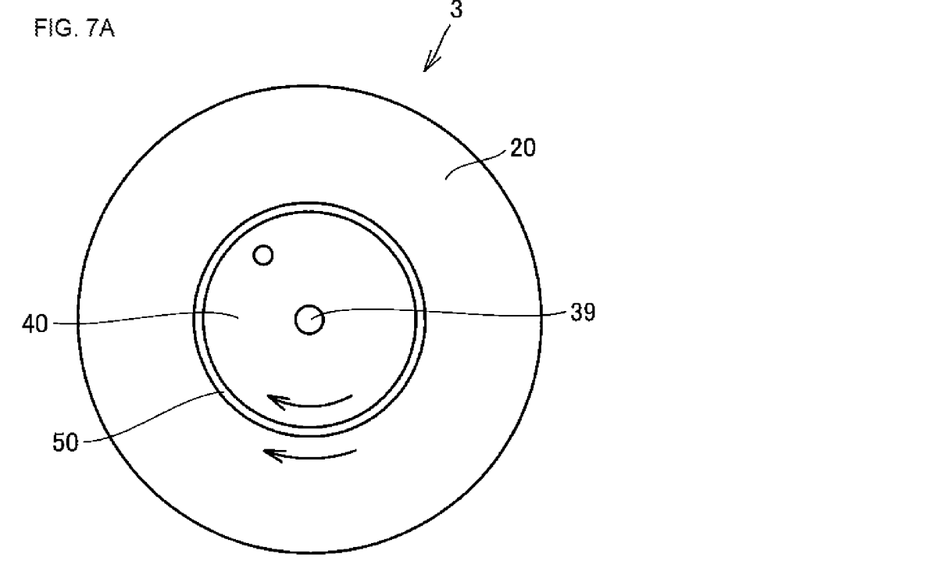
FIGS. 7A and 7B schematically show the movement of the wheel structure according to the first embodiment.

If the operator presses the brake lever 7, as shown in FIG. 2A, the rotating member 61 rotates in a clockwise direction about the center portion 62 to bring the wires 85 close to each other. The engagement part 80 that is operatively associated with the movement of the wire 85 is pulled off from the receiving hole 42 of the rotor 40 as shown in FIG. 6A, thereby bringing the wheel 20 into a ready-to-move state. In this case, the wheel 20 and rotor 40 rotate in an integrated manner about the axle 39 as shown in FIG. 7A.

If the operator takes his/her hand off the brake lever 7, as shown in FIG. 2B, the rotating member 61 rotates in a counterclockwise direction about the center portion 62 to move the wires 85 away from each other. The engagement part 80 that is operatively associated with the movement of the wire 85 is received by and engaged with the receiving hole 42 of the rotor 40 as shown in FIG. 6B, thereby stopping the rotation of the rotor 40. Since the rotor 40 is not secured to the wheel 20, as shown in FIG. 7B, the wheel 20 keeps rotating, but gradually stops rotating due to frictional resistance force generated between the rotor 40 in the stopped state and the wheel 20 in the rotational state by the friction member 50 held by the rotor 40.

According to the configuration, the operator's unintentional release of the brake lever 7 does not cause an immediate stop of the rotation of the wheel 20; however, the brake member 8 stops the rotor 40 from rotating, and the wheel 20 rotating relative to the rotor 40 gradually stops rotating, and accordingly the stroller 1 does not make a sudden stop. In addition, this configuration does not require the operator to apply force to brake the stroller 1, and therefore the operator can apply a brake easily.

The friction member 50 in the above-described embodiment is biased radially inward from the rotor 40 and abuts against the axle supporting section (raised wall 30 of the cylindrical member 28). The following embodiment describes a wheel structure 3A including a friction member 50A that is biased radially outward from a rotor 40A and abuts against a tire holding section.

Figure 8:
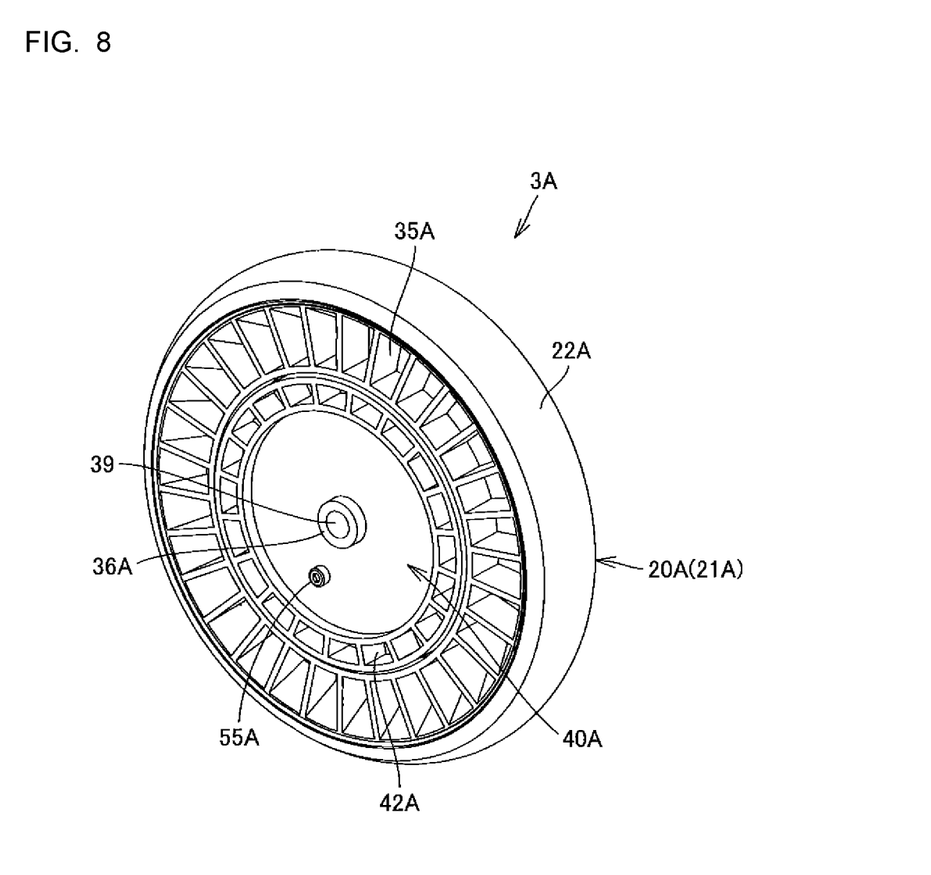
FIG. 8 is a perspective view of a wheel structure according to the second embodiment.
Figure 9:
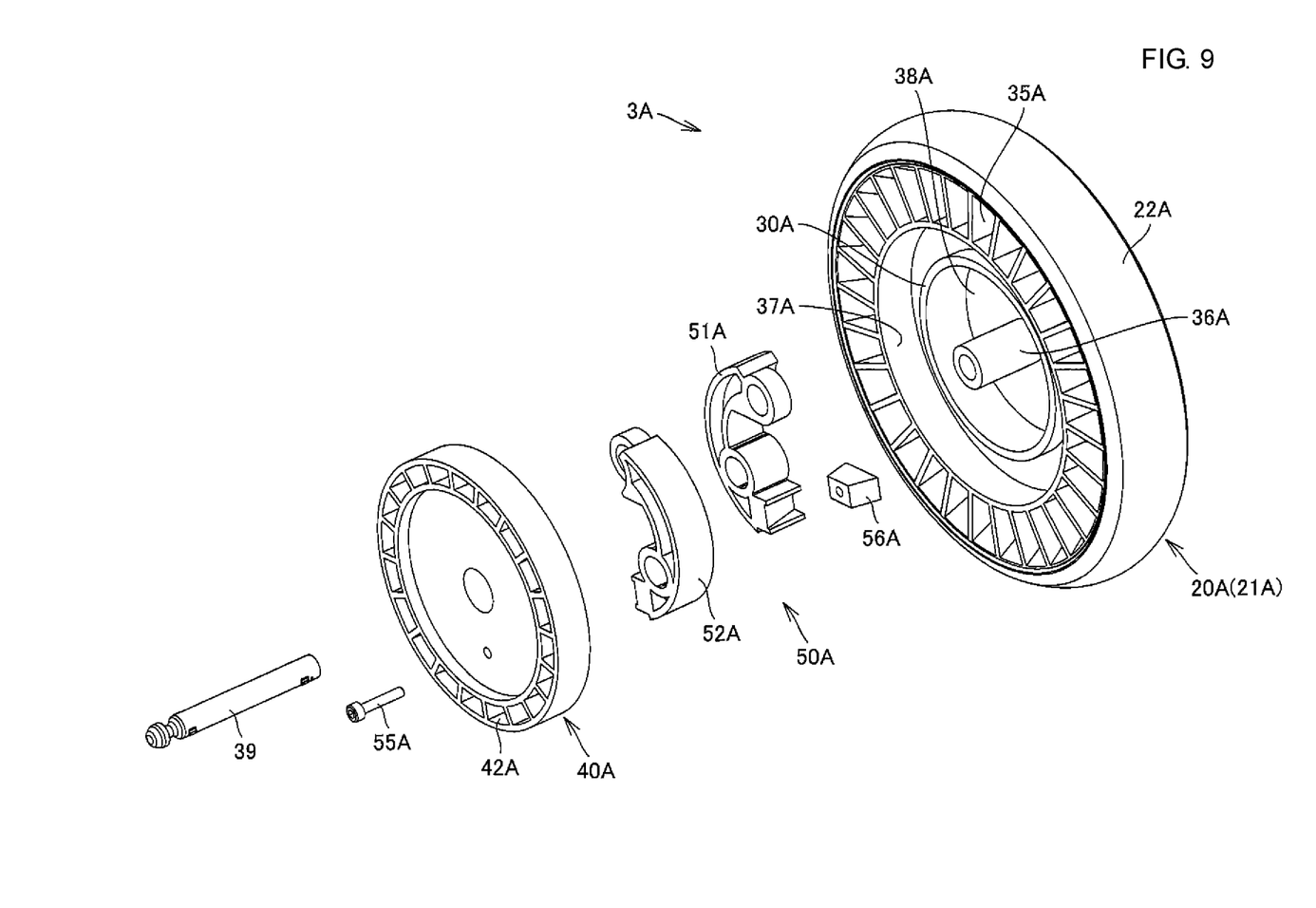
FIG. 9 is an exploded perspective view of the wheel structure according to the second embodiment.

About Second Embodiment—Referring to FIGS. 8 and 9, the wheel structure 3 according to the second embodiment will be described.

In this embodiment, the wheel structure 3A includes a wheel 20A that is composed of a main wheel body 21A alone, which is different from the first embodiment. The main wheel body 21A includes an axle supporting section 36A that supports an axle 39, and a tire holding section 37A that holds a tire 22A facing the axle supporting section 36A and making contact with road surfaces. The tire holding section 37A includes a raised wall 30A that is disposed between the tire holding section 37A and the axle supporting section 36A. A ring-shaped recessed section 38A is formed between the raised wall 30A and the axle supporting section 36A. Between the tire 22A and tire holding section 37A provided are a plurality of engagement holes 35A for engaging with a parking brake member (not shown) that is provided to park the stroller 1.

In this embodiment, the rotor 40A is roughly in the shape of a disk, and includes a center hole through which the axle 39 passes, and a plurality of receiving holes 42A in the vicinity of the outer edge thereof, with which an engagement part 80 of the brake member 8 (FIGS. 6A and 6B) is engaged.

In this embodiment, the friction member 50A is held by the rotor 40A, is biased radially outward from the rotor 40A, and abuts against the raised wall 30A. The friction member 50A abuts against the raised wall 30A of the wheel 20A and is frictionally engaged with the wheel 20A. The friction member 50A includes, for example, a pair of abutment parts 51A, 52A that abut against the raised wall 30A. Each of the abutment parts 51A, 52A is roughly shaped like an arc so as to fit along the raised wall 30, which is circular when viewed from the front. The abutment parts 51A, 52A have holes in their upper areas, and are secured with a pin (not shown) inserted through the holes.

Each of the abutment parts 51A, 52A has an inclined portion that expands axially outward at a lower position thereof. Between the inclined portions of the abutment parts 51A, 52A disposed is an adjustment member 56A, which is roughly in the shape of a trapezoid expanding axially outward. The adjustment member 56A is connected to a rotational screw 55A that passes through a hole formed in the rotor 40A and is used to adjust the position of the adjustment member 56A in the axial direction. Rotating the rotational screw 55A moves the adjustment member 56A axially outward, and biases the abutment parts 51A, 52A radially outward. This movement can adjust the length in which the friction member 50A projects from the rotor 40A toward the raised wall 30A of the main wheel body 21A, and as a result, the friction member 50A can adjust the frictional force to be applied on the raised wall 30A.

Figure 6B:
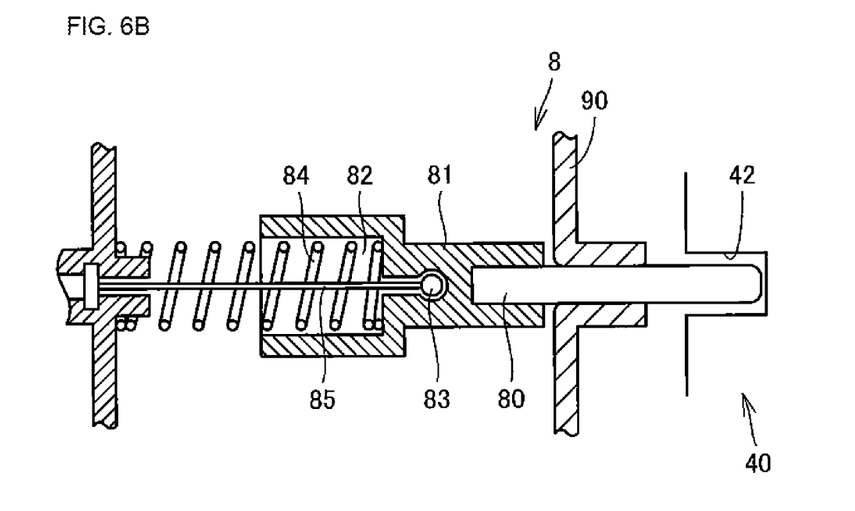
Figure 7B:
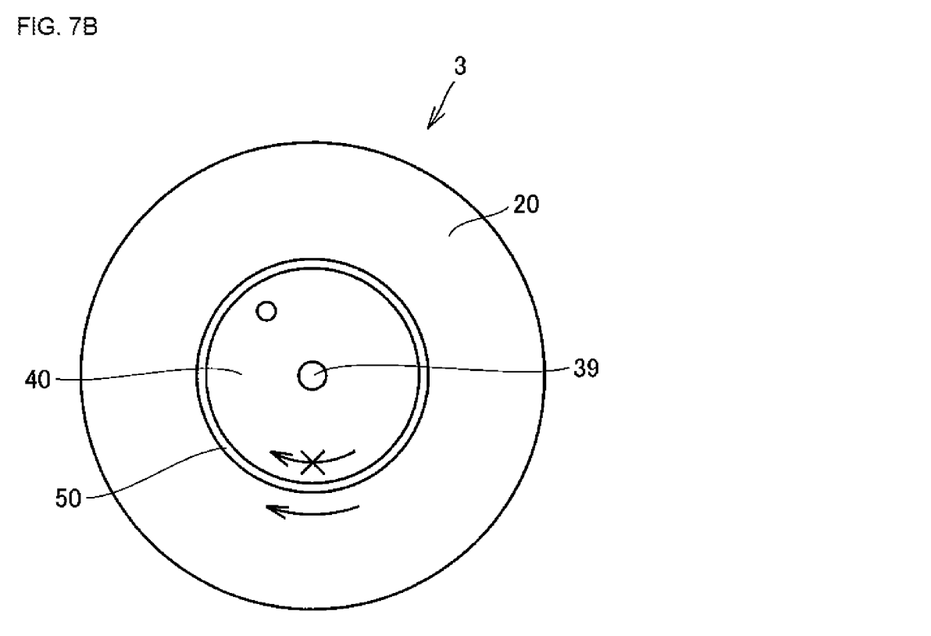

In the above-described first and second embodiments, the brake member 8 is designed to be freely inserted into and extracted from the holder 90 in the axial direction as shown in FIGS. 6A and 6B. The following embodiment will provide a description about a wheel structure 3B using a brake member 8B that rotationally moves relative to a holder 90.

Figure 11:
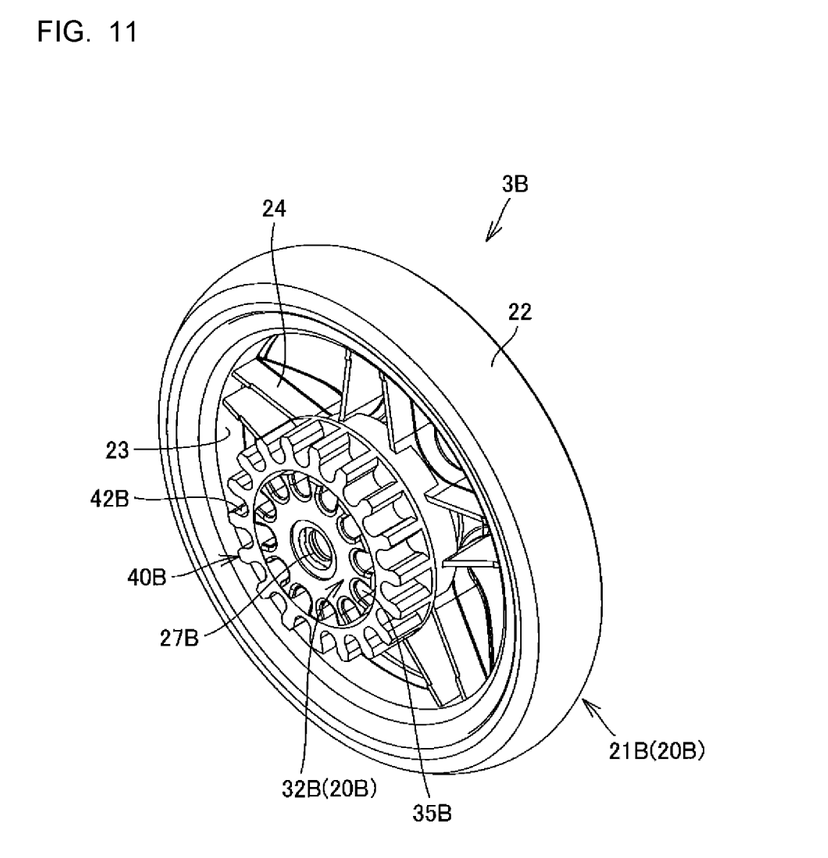
FIG. 11 is a perspective view of the wheel structure according to the third embodiment.

About Third Embodiment—Referring to FIGS. 10 to 12, the wheel structure 3B and brake member 8B according to the third embodiment will be described.

Figure 12:
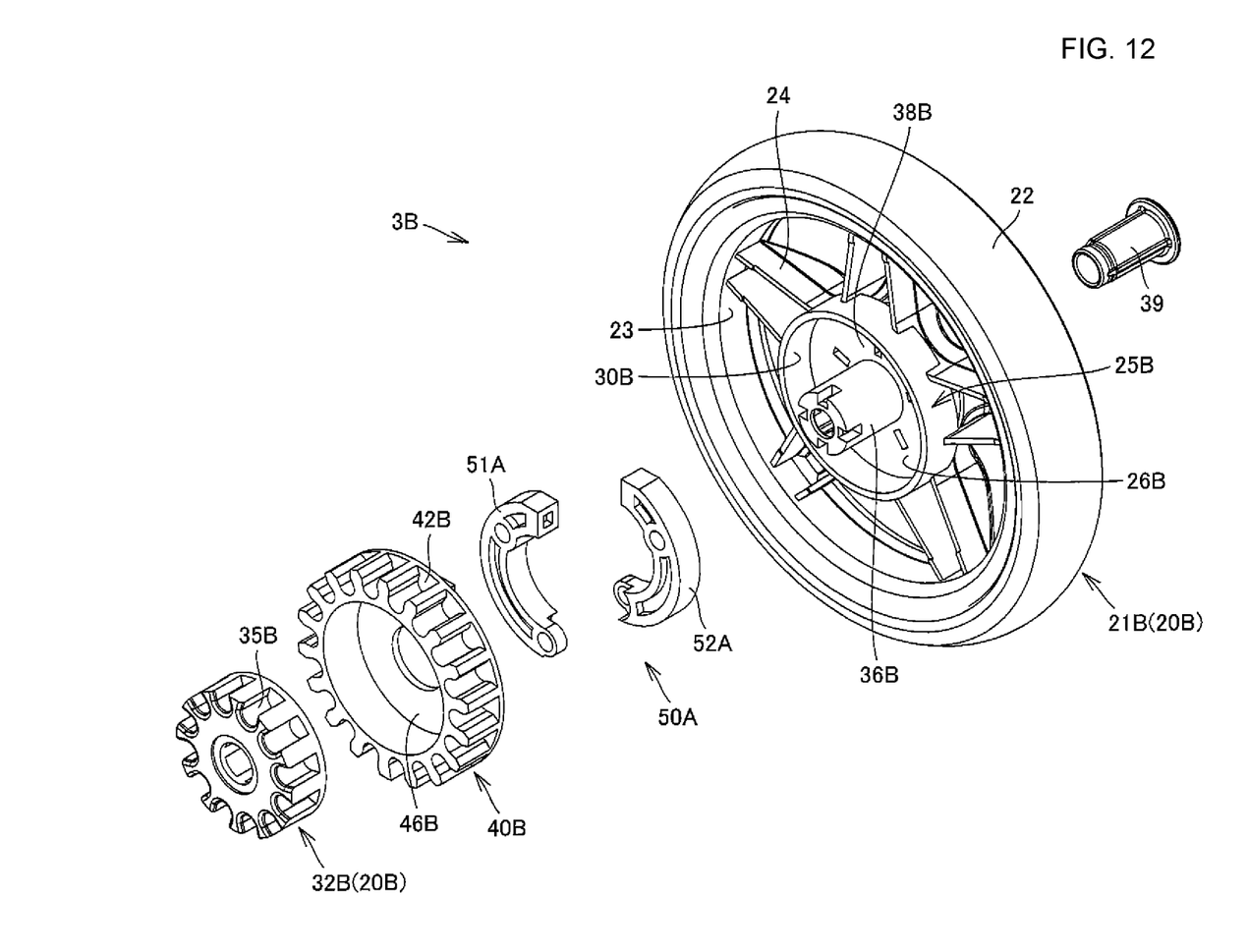
FIG. 12 is an exploded perspective view of the wheel structure according to the third embodiment.

Referring particularly to FIG. 12, the wheel 20B in this embodiment includes a main wheel body 21B and a cover 32B. The main wheel body 21B includes an axle supporting section 36B that supports an axle 39, a disk portion 26B where the axle supporting section 36B placed in the center, a raised wall 30B (tire holding section) that is raised from the outer edge of the disk portion 26B, and a ring-shaped recessed section 38B that is formed between the raised wall 30B and axle supporting section 36B.

The cover 32B is roughly in the shape of a disk, and includes a center hole through which the axle supporting section 36B passes, and engagement holes 35B on the outer circumferential surface thereof. The cover 32B rotates with the main wheel body 21B in an integrated manner.

In this embodiment, a rotor 40B is roughly in the shape of a disk, and includes a recessed portion 46B with a center hole through which the axle supporting section 36B passes, and a plurality of receiving holes 42B. The cover 32B is housed in the recessed portion 46B. The receiving holes 42B are, for example, grooves that are easily engaged with the rotationally moving brake member 8B.

The friction member 50A is almost the same in shape as the friction member 50A in the second embodiment. The friction member 50A is held by the rotor 40B, and biased radially outward from the rotor 40A. The friction member 50A is placed inside the ring-shaped recessed section 38B and abuts against the raised wall 30B.

Referring particularly to FIG. 10, the brake member 8B is attached to a holder 90 with a rotation shaft 86B, and includes a main brake body 81B and an engagement part 80B to be engaged with the receiving holes 42B of the rotor 40B. The engagement part 80B is, for example, a projecting portion that projects toward the wheel 20B, and is designed so as to pivot about the rotation shaft 86B.

The main brake body 81 rotatably holds a spherical object 83B connected to one end of a wire 85. Pressing the brake lever 7 (FIGS. 2A and 2B) pulls down the wire 85 and turns the main brake body 81B in a clockwise direction about the rotation shaft 86B, and the main brake body 81B is thereby displaced to a non-engagement position where the engagement part 80B is not engaged with a receiving hole 42B. Releasing the brake lever 7 pulls up the wire 85 and turns the main brake body 81B in a counterclockwise direction about the rotation shaft 86B, the main brake body 81B is thereby displaced to an engagement position where the engagement part 80B is engaged with a receiving hole 42B. This embodiment is different from the above-described configuration in that the brake lever 7 is not provided with a rotating member 61. Instead, the brake lever 7 is configured to pull down the wire 85 when being pressed, while pulling up the wire 85 when being released.

The holder 90 is provided with a parking brake member 94B used to park the stroller 1. If the parking brake member 94B is pressed from above, a pin 93B provided at a lower end sticks out toward the cover 32B to engage with an engagement hole 35B. The cover 32 that is secured to the main wheel body 21B can instantly stop the rotation of the wheel 20B when the engagement hole 35B of the cover 32B is engaged with the pin 93B of the parking brake member 94B.

The relative-rotation resisting members of the wheel structures 3, 3A, 3B described in the above embodiments are friction members. However, all the relative-rotation resisting members need to do is to produce resistance force resisting the relative rotation of the rotor and wheel, and therefore, the relative-rotation resisting members can be anything that produces resistance force by using, for example, magnetic force or pressure.

Although the relative-rotation resisting members 50, 50A, 50B of the wheel structures 3, 3A, 3B according to the above-described embodiments are configured to be held by the rotors 40, 40A, 40B, the wheels 20, 20A, 20B can be configured to hold the relative-rotation resisting members 50, 50A, 50B, respectively. In this case, the relative-rotation resisting members 50, 50A, 50B abut against the rotors 40, 40A, 40B, respectively to achieve frictional engagement.

In addition, the wheels 20, 20A, 20B do not always need to include the axle supporting section, tire holding section, and ring-shaped recessed section. In a case where the wheel is a ring-shaped component having only the tire holding section, the rotors 40, 40A, 40B can be disposed inside the tire holding section.

Although the ring-shaped recessed section 38A of the wheel structure 3A according to the second embodiment is configured to be provided between the axle supporting section 36A and raised wall 30A, the ring-shaped recessed section 38A can be provided between the raised wall 30A and tire holding section 37A. In this case, the relative-rotation resisting member 50A is disposed between the raised wall 30A and tire holding section 37A.

In addition, the stroller 1 is configured to have dual-wheels 2. The wheel structure 3 according to the first embodiment can be applied to at least one of the two wheels 20 making up a dual-wheel 2, and the wheel structures 3A and 3B according to the second and third embodiments can be applied to the wheels 20A, 20B, respectively, in the same way. Alternatively, the stroller 1 in the above-described embodiments can have single-wheels rather than dual-wheels.

Although the brake member 8 of the stroller 1 according to the above-described embodiments is operated by the brake lever 7 provided as an operation unit above the handle portion 6, the operation unit can be provided, for example, in the vicinity of a wheel so as to be operable by foot. In the case where the operation unit is mounted in the vicinity of the handle portion 6, the stroller 1 can be configured so that a brake is applied when the operator presses the operation unit, while the brake is released when the operator takes his/her hand off the operation unit.

The stroller 1 described in the embodiments is to embody the pushcart of the present invention; however, the invention is not limited to strollers, and can be applied to various types of pushcarts, such as childcare items including high-low beds and chairs, rolling walkers for elderly people, and shopping carts.

It should be understood that the embodiments disclosed herein are illustrative and non-restrictive in every respect. The scope of the present invention is defined by the terms of the claims, rather than by the foregoing description, and is intended to include any modifications within the scope and meaning equivalent to the terms of the claims.

What is claimed is:

1. A wheel structure comprising:
 a rotor that is rotatable about an axle and is stopped from rotating by a brake member;
 a wheel that is coaxial with the rotor and is rotatable about and with respect to the rotor; and
 a relative-rotation resisting member that is disposed between the rotor and the wheel and produces resistance force resisting relative rotation of the rotor and wheel.

2. The wheel structure according to claim 1, wherein the magnitude of the resistance force applied by the relative-rotation resisting member is set so as to rotate the wheel and the rotor in an integrated manner when the relative rotational force generated between the wheel and rotor is a predetermined value or lower, and is set so as to permit the wheel and rotor to rotate relative to each other when the relative rotational force generated between the wheel and rotor exceeds the predetermined value.

3. The wheel structure according to claim 1, wherein the relative-rotation resisting member is a friction member that is held by one of the rotor and the wheel, and abuts against and frictionally engages with the other.

4. The wheel structure according to claim 1, wherein
 the wheel includes an axle supporting section that supports the axle, a tire holding section that faces the axle supporting section and holds a tire making contact with road surfaces, and a ring-shaped recessed section that is provided between the axle supporting section and the tire holding section, and the rotor is disposed inside the ring-shaped recessed section.

5. The wheel structure according to claim 4, wherein the relative-rotation resisting member is a friction member that is held by the rotor, is biased radially inward from the rotor, and abuts against the axle supporting section.

6. The wheel structure according to claim 5, wherein the friction member is provided such that the length in which the friction member projects from the rotor toward the axle supporting section is adjustable.

7. The wheel structure according to claim 4, wherein the relative-rotation resisting member is a friction member that is held by the rotor, is biased radially outward from the rotor, and abuts against the tire holding section.

8. The wheel structure according to claim 7, wherein the friction member is provided such that the length in which the friction member projects from the rotor toward the tire holding section is adjustable.

9. The wheel structure according to claim 1, wherein the rotor has a receiving hole that receives and is engaged with the brake member.

10. A pushcart comprising:
a main body frame that holds an axle;
a rotor that is rotatable about the axle;
a wheel that is coaxial with the rotor and is rotatable about and with respect to the rotor;
a brake member that is displaced between an engagement position where the brake member is engaged with the rotor to stop the rotor from rotating, and a non-engagement position where the brake member permits the rotor to rotate without being engaged with the rotor; and
a relative-rotation resisting member that is disposed between the wheel and the rotor and produces resistance force resisting relative rotation of the rotor and wheel.

11. The pushcart according to claim 10, wherein the pushcart is a stroller.

12. The pushcart according to claim 10, wherein the relative-rotation resisting member is a friction member.

13. The pushcart according to claim 12, wherein the relative-rotation resisting member is held by one of the rotor and the wheel, and abuts against and frictionally engages with the other.

14. The pushcart according to claim 10, wherein the rotor has a receiving hole that receives a portion of the brake member in the engagement position.

15. The pushcart according to claim 10, wherein the relative rotation resisting member is biased radially inward from the rotor.

16. The pushcart according to claim 10, wherein the relative rotation resisting member is biased radially outward from the rotor.

17. The pushcart according to claim 10, wherein the relative-rotation resisting member comprises an adjustment mechanism for adjusting a force applied by the relative-rotation resisting member.

18. An apparatus comprising:
a stroller comprising:
a main body frame:
a stroller seat coupled to the main body frame;
an axle coupled to the main body frame;
a rotor that is rotatable about the axle;
a wheel that is coaxial with the rotor and is rotatable about and with respect to the rotor; and
a relative-rotation resisting member that is disposed between the wheel and the rotor and produces resistance force resisting relative rotation of the rotor and wheel.

19. The apparatus according to claim 18, wherein the stroller seat is removably coupled to the main body frame.

20. The apparatus according to claim 18, wherein the relative-rotation resisting member is a friction member.

* * * * *